United States Patent [19]

Fowler et al.

[11] 4,163,544

[45] Aug. 7, 1979

[54] TWO PIECE COMPOSITE VALVE SEAL RING CONSTRUCTION

[75] Inventors: James M. Fowler, Missouri City; Bertram L. Morrison, Houston, both of Tex.

[73] Assignee: ACF Industries, Incorporated, New York, N.Y.

[21] Appl. No.: 850,184

[22] Filed: Nov. 10, 1977

[51] Int. Cl.² ............................ F16K 3/02; F16K 5/06
[52] U.S. Cl. .................................. 251/328; 251/315; 251/364
[58] Field of Search ......................... 251/328, 315, 364

[56] References Cited
U.S. PATENT DOCUMENTS

| | | | |
|---|---|---|---|
| 3,121,553 | 2/1964 | Grove | 251/328 X |
| 3,765,440 | 10/1973 | Grove et al. | 251/328 X |
| 3,765,647 | 10/1973 | Grove et al. | 251/328 X |

*Primary Examiner*—Arnold Rosenthal
*Attorney, Agent, or Firm*—Eugene N. Riddle

[57] ABSTRACT

A valve seal includes inner and outer concentric seal rings located side by side in a groove with the inner seal ring against the groove inner wall and the outer seal ring against the groove outer wall. Interfitting surfaces are provided on the seal rings to hold them together and prevent longitudinal movement between them. The groove and the seal rings cooperate to hold the seal rings in the groove. One of the seal rings is relatively soft and has good low pressure sealing characteristics while the other seal ring is relatively hard and has good high pressure sealing characteristics.

8 Claims, 8 Drawing Figures

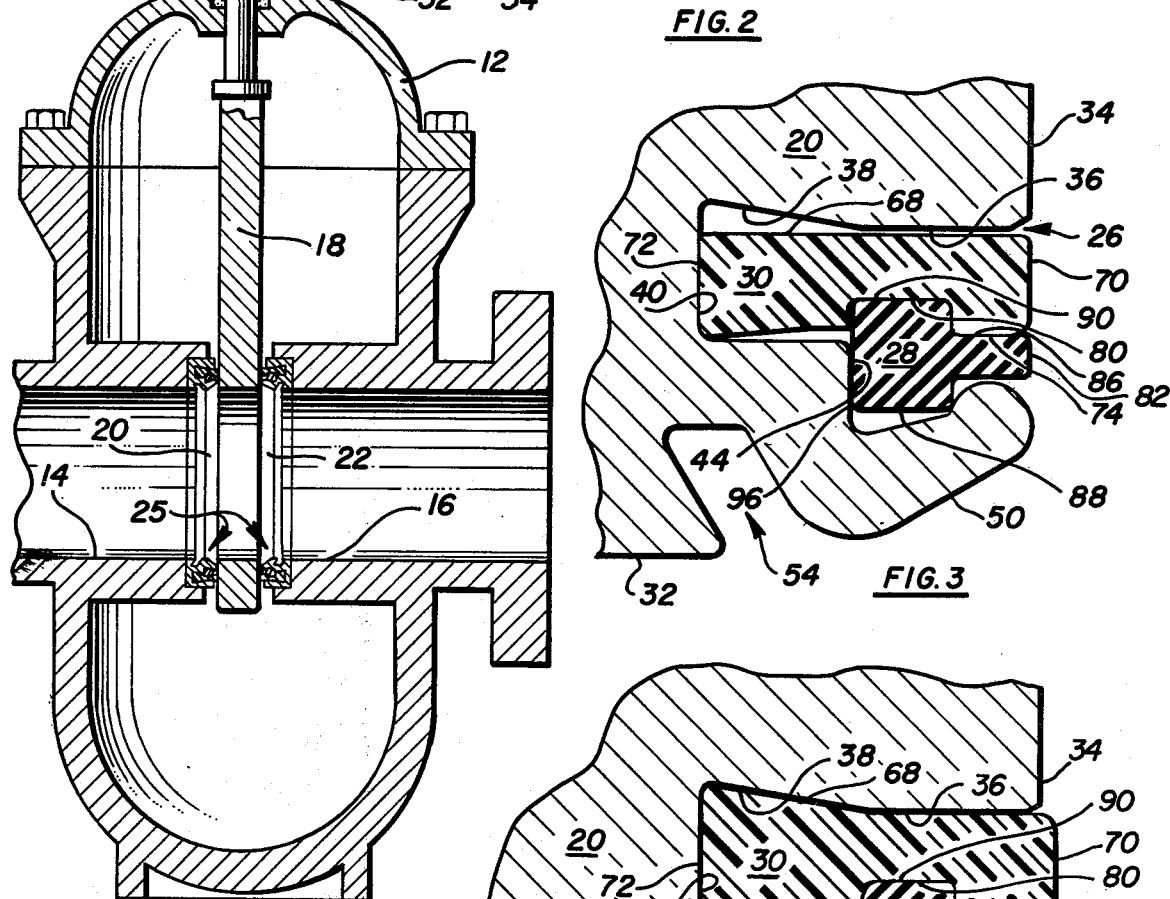

U.S. Patent   Aug. 7, 1979   Sheet 2 of 2   4,163,544
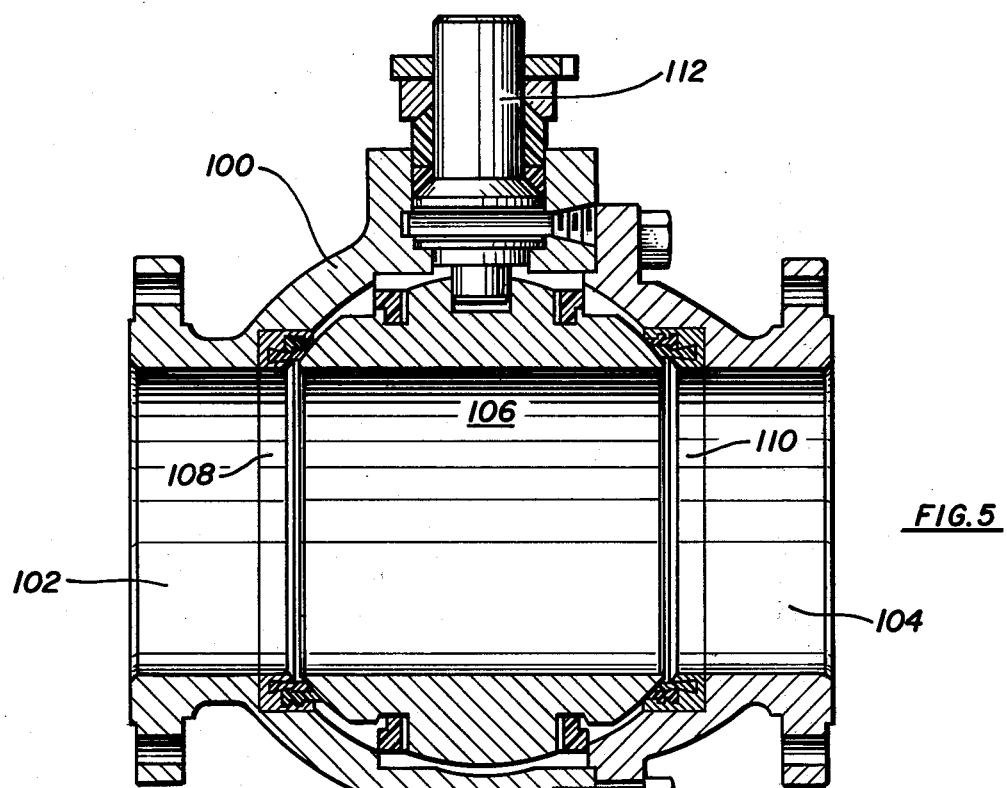
FIG.5
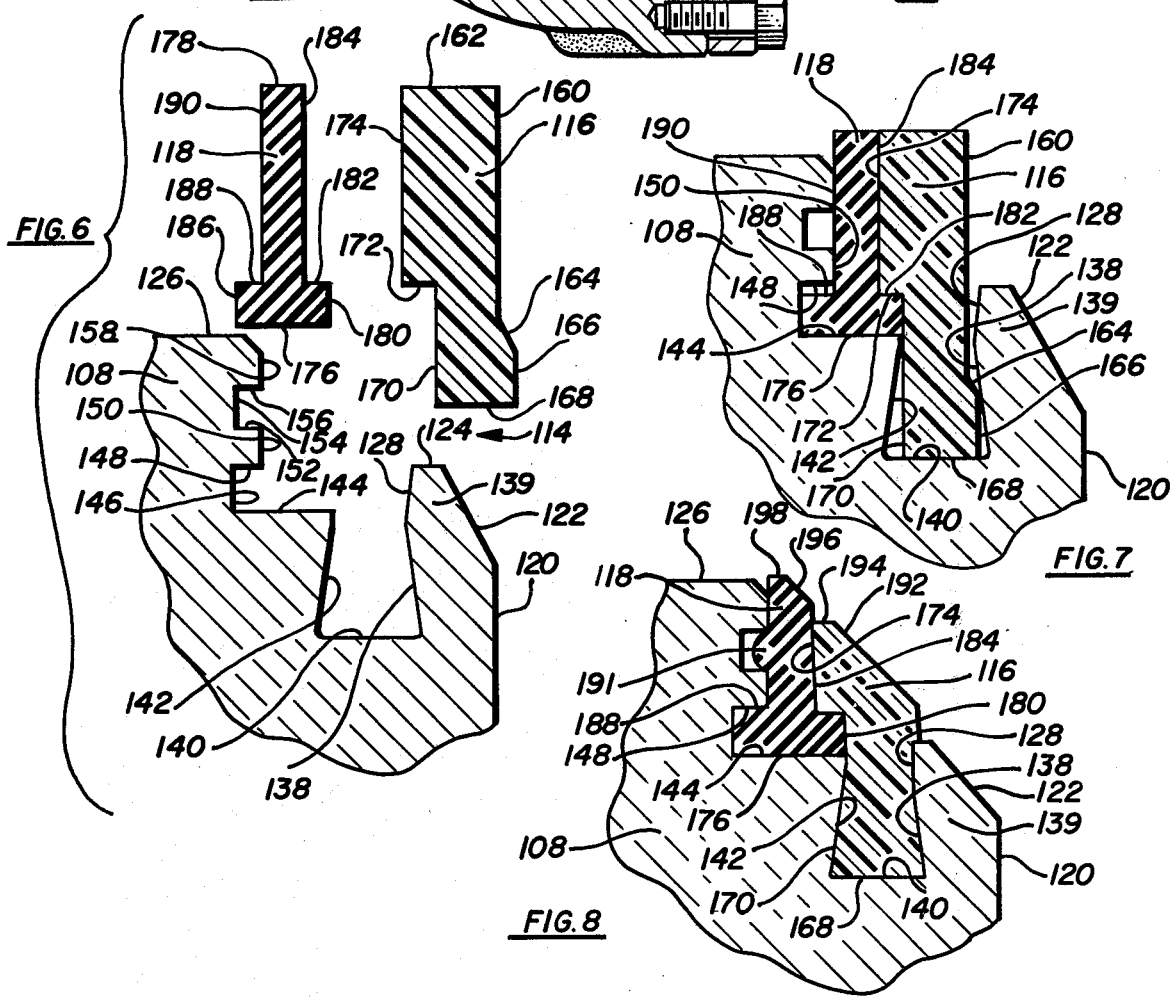
FIG.6
FIG.7
FIG.8

TWO PIECE COMPOSITE VALVE SEAL RING CONSTRUCTION

BACKGROUND OF THE INVENTION

This invention is related to two piece seal rings for valves employing nonmetallic seal elements. In the past, many composite valve seal constructions have employed a combination of separate rings to form a seal ring that is either carried by the body of a valve or by an insertable seat ring. These valve seal constructions usually include a non-metallic element and a metallic element or two non-metallic elements which are retained in the valve body or the valve seat ring by mechanical pressure only. The patent of E. H. Vickery, U.S. Pat. No. 3,077,902 issued Feb. 19, 1963, illustrates metallic and non-metallic seal elements retained in the valve by pressure exerted on them by a removable ring that is secured by fasteners or bolts. The patent of Grove et al, U.S. Pat. No. 3,765,647 issued Oct. 16, 1973, illustrates a pair of non-metallic seal elements which are secured in the groove by a lip portion of the seat ring which is bent or rolled over a portion of one of the elements during the manufacture. In this latter construction, a cement or bonding agent is applied to the adjoining surfaces of the two seal rings and the supporting structure prior to bending the lip over the inner seal ring.

The major difficulties with sealing assemblies of the type shown in the Grove patent are obtaining a good dependable bond between the sealing elements and bending the lip. Also, due to the generally circular cross-section of the seal member adjacent to the lip a very elaborate technique must be utilized to retain the seal element in place as the lip is being bent without the seal element escaping due to the lubrication of the cement. This type of difficulty makes this seat very expensive to manufacture.

SUMMARY OF THE INVENTION

In an embodiment the valve seal includes inner and outer concentric seal rings which are mounted in a groove and held against the groove sides. Interfitting surfaces are provided on the seal rings to hold them together thus preventing longitudinal movement between the seal rings. The groove and the seal rings cooperate to hold the seal rings in the groove. One of the seal rings is relatively soft and provides a good low pressure seal while the other seal ring is relatively hard and provides a good high pressure seal.

In one embodiment of the invention, the inner seal ring is the harder material and in another embodiment the inner ring is the softer material.

One object of this invention is to overcome the aforementioned disadvantages of the prior art devices.

Still, one other object of this invention is to provide a valve seal structure including concentric inner and outer seal rings which have interfitting surfaces to hold the seal rings together and prevent longitudinal movement between them.

Still, another object of this invention is to provide a two piece composite valve seal ring construction in which the groove and the seal rings are all provided with interfitting surfaces shaped to retain the seal rings together and in the groove without the use of bonding agents or adhesives.

Various other objects, advantages, and features of this invention will become apparent to those skilled in the art from the following discussion, taken in conjunction with the accompanying drawings, in which:

DESCRIPTION OF THE DRAWINGS

FIG. 1 is a cutaway elevation view of a gate valve employing the novel two piece composite valve seal ring construction of this invention;

FIG. 2 is an enlarged and exploded view of a fragment of the gate valve seat for the valve shown in FIG. 1 showing the seal ring groove with the inner and outer seal rings spaced therefrom;

FIG. 3 is an enlarged cross-sectional view of the valve seat fragment shown in FIG. 1 with the seal rings in place in the groove in the position which they are placed prior to deformation of the seat to retain the seal rings;

FIG. 4 is an enlarged cross-sectional view of the completed and finished valve seat fragment shown in FIG. 1 with the seat in a completed condition;

FIG. 5 is a cross-sectional elevational view of a ball valve employing the novel two piece composite valve seal ring construction of this invention;

FIG. 6 is an enlarged and exploded cross-sectional view of a fragment of the ball valve seat for the valve of FIG. 5 showing the groove with the inner and outer seal ring members spaced therefrom;

FIG. 7 is an enlarged cross-sectional view of the groove and the seat fragment shown in FIG. 6 with the seal members placed in the groove in the position which they are placed prior to deformation of the seat; and FIG. 8 is an enlarged cross-sectional view of the completed two piece composite valve seal ring assembly of this invention for the valve shown in FIG. 5.

The following is a discussion and description of preferred specific embodiments of the two piece composite valve seal ring construction of this invention with such being made with reference to the drawings, whereupon the same reference numerals are used to indicate the same or similar part and/or structure. It is to be understood that such discussion and description is not to unduly limit the scope of the invention.

DETAILED DESCRIPTION

This description covers two specific embodiments of the valve seal ring of this invention with one of the embodiments directed to use in a gate valve and the other directed to use in a ball valve. The gate valve embodiment is described first with the description of the ball valve oriented embodiment described thereafter.

Referring to FIG. 1, such shows a common parallel sided slab gate valve employing the novel two piece composite valve seal ring of this invention. The gate valve shown in FIG. 1 includes a valve body 12 having inlet and outlet flow passageways 14 and 16 in fluid communication with a valve chamber, a gate member 18 in the valve chamber for movement between open and closed positions relative to the flow passageways, and upstream and downstream seats 20 and 22 mounted in the valve body around the flow passageways. A stem 24 is connected with gate 18 for use in moving gate 18 between the open and closed positions. Seats 20 and 22 are mounted in annular recesses around the respective flow passageways. Both seats 20 and 22 are identical and have seal ring constructions of this invention. These seal rings are indicated generally at 25.

FIG. 2 shows a portion of upstream seat 20 and the seal rings for same in the configuration to which they are manufactured before the seat is assembled into its final condition. Seat 20 has a groove indicated generally at 26 to receive and mount inner seal ring 28 and outer seal ring 30 together as shown in FIGS. 3 and 4. Seat 20 is an annular member with an internal bore 32 therethrough and an inner side surface or sealing face 34 which lies adjacent to gate 18 when the seat is in the valve. Groove 26 faces the valve chamber and opens to inner seat face 34 around the seat. In all of the following description, references to inner and outer are made with respect to the longitudinal axis of the flow passageways and with respect to the gate. Groove 26 includes an inner side which is closest to bore 32, a bottom, and an outer side which is opposite to the inner side. A groove outer side includes a cylindrical bore portion 36 joining seat face 34 and extending to a mid-portion of the groove outer side where it joins a radially outwardly tapering portion 38 that extends to groove bottom 40. Groove bottom 40 is generally transverse to seat bore 32. The groove inner side includes a generally cylindrical portion 42 extending from groove bottom 40 toward the open portion of the groove. A cross-sectionally enlarged portion of groove 26 is provided in a mid-portion of the groove by a stepped surface 44 joining inner side surface 42 and extending radially inward to an inclined surface 46. Inclined surface 46 is frusto-conical and extends from step surface 44 in an outwardly inclined relation with the smaller diameter portion of this surface joining step 44. A convex surface 48 joins the larger diameter end of surface 46 and extends outwardly relative to bore 32 and groove bottom 40 forming a cross-sectionally rounded inner end portion of the inner wall. Surface 48 extends around the inner end of the inner wall to a generally frusto-conical seat inner surface 50. Inner surface 50 extends inwardly from convex surface 48 toward bore 32. The interior of seat 20 is provided with a radially outwardly oriented dividing groove 54 extending outwardly from bore 32 approximately in transverse alignment with groove bottom 40. Dividing groove 54 has an inner surface 56 which is angularly oriented relative to bore 32 and seat face 34 joining a curved surface 58 that connects same to inner surface 50. Dividing groove 54 has a bottom 60 generally concentric with bore 32, an inner side 56 that joins curved surface 58, and an outer side 62 that joins bore 32. Dividing groove 54 extends in an angular relation to seat bore 32 and seat face 34. The interior of seat 20 between seal groove 26 and the portion which is in fluid communication with bore 32 defines a seat lip 66.

Lip 66 is shaped to bend radially outward against the interior of the seal rings. The innermost portion of lip 66 is thinner than the outermost or root portion thereof so it is deflected first. In FIG. 2 dimension "A" is significantly thicker than dimension "B" so as a tool is inserted into seat 20 to bend lip 66 the thinner portion will bend first. Bending of the lip thinner portion secures the inner portions of the seal rings and bending of the thicker portion in the area of dividing groove 54 secures the outer portion of seal ring 30 by deforming it into the enlarged bottom portion of seat groove 26.

In FIG. 2 the outer seal ring 30 is shown spaced from seat 20 and inner seal ring 28. Outer seal ring 30 includes a generally cylindrical outer surface 68 connecting a seal face 70 on one end and a back surface 72 on the opposite end, a conical internal surface 74, and a groove in surface 74 extending radially outward into a mid-portion of the seal ring. This outer seal groove is defined by opposing sides 76 and 78 and a bottom surface 80. Groove ends 76 and 78 are generally transverse to cylindrical outer surface 68 and groove bottom 80 is generally concentric with bore 32.

Inner seal ring 28 is shown in its free or unloaded position in FIG. 2 along with other portions of the seat structure. Inner seal ring 28 is generally T-shaped and includes an enlarged transverse portion of one end portion thereof and a smaller elongated portion on the opposite end thereof. The smaller portion of inner seal 28 terminates at the inner seal face 82 and includes an inner side 84 and an opposed outer side 86 which are concentric and extend outwardly to the enlarged transverse portion. The enlarged transverse portion of inner seal 28 includes an inner side 88 and an outer side 90 which are concentric with bore 32 and respectively join sides 84 and 86 at radially disposed abutments 92 and 94. The back side of inner seal 28 includes a back surface 96 joining inner and outer sides 88 and 90 and extending generally transverse to seat bore 32.

For this embodiment of the seal construction which is used in a gate valve, it is preferable that inner seal ring 28 be constructed of a relatively soft material and outer seal ring 30 be constructed of a relatively hard material. With this general choice of materials, inner seal ring 28 provides a sealing element having good low pressure sealing characteristics because of the ability of the softer material to deform at relatively low pressure and sealingly engage the surface of the gate. Because outer seal ring 30 is constructed of a harder material, it has better high pressure sealing characteristics because it will maintain sealing contact with the gate surface under high pressure loading conditions. Additionally, because outer seal ring 30 is of a harder material, it forms a wiper ring to display any foreign material which might accumulate on the gate sealing surface so that the sealing surface of the gate is cleaned as it is moved between the open and closed positions. Inner seal ring 28 can be constructed of any of the relatively soft materials commonly used for valve seal rings such as a natural rubber or synthetic rubber, a material such as Buna-N or any other suitable elastomeric material. Outer seal ring 30 can be constructed of any of the relatively hard and resilient materials commonly used for valve seal rings such as nylon, Teflon, and Nylatron or any other suitable material having generally similar characteristics.

FIG. 3 shows inner and outer seal rings 28 and 30 mounted in seal groove 26 in the position which they are placed prior to the deformation of seat lip 66 in the assembly process. In this position outer seal ring 30 has seal back surface 72 resting on groove bottom 40, inner seal ring back surface 96 resting on groove stepped surface 44, and the outer portion of the inner seal enlarged portion fully engaged in the outer seal interior groove. In the manufacturng process securing of the seal rings in seat 20 is accomplished by placing seat 20 in a suitable fixture and inserting a mandrel, swaging tool or similar apparatus into the seat in contact with inner wall inner surface 50. Displacing this tool into seat 20 causes bending of lip 66 in a generally radially outward direction. Because the cross-section of lip 66 is narrower at dimension "B" than at dimension "A", the rounded surface portion 48 of lip 66 is pressed against inner seal surfaces 84 and 92 and groove inner wall inner surface 48 is pressed against seal inner surface 88 as initial deformation of lip 66 occurs. Following this initial deformation the cross-sectionally thicker portion of lip 66 indicated at dimension "A" is bent as the tool moves further into seat 20 thereby bending the entire lip and thus deforming the groove inner wall against the inner surfaces of both seal rings to the final position as shown in FIG. 4. In this final position lip 66 is sufficiently deformed to compress or forcefully urge inner seal ring 28 against outer seal ring 30 thereby compressively retaining both seal rings in seal groove 26. At this point it is to be noted that both seal ring faces 70 and 82 extend slightly beyond the plane of seat face 34 and slightly beyond the innermost portion of rounded surface 48. Further, it is to be noted that preferably in this final position the innermost edge portion 98 on rounded surface 48 is spaced between a plane defined by seat face 34 and another plane defined by faces 70 and 82.

This spacing of the inner end of seat lip 66 provides a metal sealing surface which will contact the gate upon the deterioration of the seal members either through usage or consumption by fire or extreme heat. When seat 20 in installed in the valve shown in FIG. 1, seal ring faces 70 and 82 contact the sealing surface of gate 18. When the gate is moved between open and closed positions outer seal ring 30, because of its harder and more rigid characteristics, provides for sealing at high pressures and cleans the gate as it moves past the seat to prevent inner seal ring damage due to foreign material on the gate. Also, seal ring 30 provides protection of the inner seal ring from high velocity flow rates occurring at the seat as the gate is moved from the closed position to the open position during the initial portion of the gate travel.

FIGS. 5 through 8 inclusive illustrate the second embodiment of the seal construction of this invention wherein the seal rings are adapted for use in a ball valve as shown in FIG. 5. The ball valve shown is a trunnion mounted style ball valve including a valve body 100 with inlet and outlet flow passageways 102 and 104, and having a ball valve member 106 rotatably mounted on trunnions in a valve chamber in the valve body. Annular seat members 108 and 110 are mounted in recesses around flow passageways 102 and 104 respectively. A stem 112 is engaged with ball valve member 106 and extends through valve body 100 to rotate ball valve member 106. Seats 108 and 110 are identical and are removably mounted in recesses around the respective flow passageways. Because of their identical nature only one seat will be described. It is to be understood that although the seal construction of this invention is shown in removable seats, the seal rings can be mounted in a groove formed in the valve body if the user so desires.

FIG. 6 shows an enlarged fragment of seat 108 with seat groove 114 therein with the inner and outer seal rings 116 and 118 spaced from the groove in an exploded configuration. Seat 108 has a cross-sectionally circular bore 120 therethrough which aligns with the flow passageway when the seat is installed in the valve. Seat groove 114 is spaced radially outward of seat bore 120 and joined to bore 120 by an inclined surface 122 and an inner end surface 124. The outer side of seat groove 114 connects seat front face 126. Seat groove 114 is defined by an inner side, a bottom, and an outer side. The seat groove inner side is comprised of two portions, an inner portion 128 which joins inner end surface 124 and an outer portion which extends to the groove bottom 140. Groove inner portion 128 is frusto-conically shaped with the larger diameter portion located in a mid-portion of the groove. Groove outer portion 138 is also frusto-conical and extends from the mid-portion of the groove to the groove bottom 140 with the smaller diameter portion at groove bottom 140. A lip 139 is formed between groove inner side, seat bore 120 and surface 122. Seat groove bottom 140 is disposed in a transverse relation to seat bore 120 and adjoins the seat groove outer side. The seat groove outer side is comprised of a stepped portion, a pair of outwardly recessed portions, and an inclined outer side 142 joining seat bottom 140. Inclined outer side 142 is frusto-conical and extends toward the open portion of the groove with the larger diameter portion joining seat bottom 140. The stepped portion of seat groove outer side includes a radially disposed surface 144 joining inclined surface 142 and extending radially outward therefrom to the larger diameter portion of the seat groove outer side. The larger diameter portion of the seat groove outer side includes a pair of outwardly extending recesses. One of these recesses is adjacent to surface 144 and formed by the outer peripheral portion of surface 144, a uniform diameter surface 146 concentric with seat bore 120, and a radially disposed surface 148 that is transverse to seat bore 120. The recesses are joined by surface 150 which is concentric with seat bore 120. The other recess is defined by radially disposed surface 152 which joins surface 150, a uniform diameter surface 154 concentric with seat bore 120, and another radially disposed surface 156. Recess surface 156 joins a uniform diameter groove side surface 158. Surface 158 is concentric with seat bore 120 and generally aligned with surface 150. A chamfered surface joins groove outer side surface 158 and seat front face 126.

Inner seal ring 116 is generally L-shaped in cross-section with the shorter portion thereof extending radially outward. The interior surface 160 of inner seal ring 116 is uniform in diameter over a major portion thereof from an inner end 162 to a mid-portion thereof where an inclined surface 164 connects surface 160 to a smaller diameter surface 166 that continues to the outer end 168. The outer side of inner seal ring 116 is comprised of a stepped portion having a smaller diameter surface portion 170 extending from outer end 168 to a mid-portion of the seal ring. A radially disposed surface 172 extends outward joining surface 170 to a larger diameter surface 174 that extends to the seat inner end 162.

Outer seal ring member 118 is generally T-shaped in cross section with one portion generally transverse to the seat bore and an elongated portion concentric with the seat bore. The end of the transverse portion defines the seal outer end 176 and the end of the longer portion defines the seal inner end 178. The inner side of the seal ring includes a small diameter surface 180 longitudinally across the interior of the shorter transverse portion, radially inwardly extending abutment 182 between the smaller diameter portion 180 and the inner side surface 184 of the longer portion. The outer side of outer seal ring 118 includes an outer peripheral surface 186 across the transverse portion, a radially disposed abutment 188 joining surface 186 with the constant diameter outer peripheral surface 190 of the longer longitudinally disposed portion.

FIG. 7 shows seal rings 116 and 118 placed in seal ring groove 114 in seat 108 with the seal rings in the shape to which they are originally manufactured and in the position in which they are placed prior to deforming seat lip 139 to secure the seal rings. Inner seal end 168 sets on the groove deeper bottom surface 140 and outer seal end 176 sets on stepped surface 144. Sides 174 and 184 of the inner and outer seal rings are in contact and outer seal side 190 contacts groove outer side surfaces 150 and 158. Surfaces 172 and 182 of the inner and outer seal rings rest in flush contact. Surfaces 148 and 188 of the seat and the outer seal ring can be spaced a part a small distance as shown in FIG. 7 if desired to permit easy insertion of the enlarged portion of seal ring 118 into the recess formed by surfaces 144, 146, and 148 of seat 108. These surfaces 148 and 188 can touch if desired to insure that seal ring 118 is secured in place.

Securing the seal rings in place in seal groove 114 is accomplished by deforming lip 139 radially outward such that it is bent over the enlarged outer portion of the outer seal ring 116 located in groove 114. Bending lip 139 urges the seal rings together with the inner seal ring being urged radially outward and the outer seal ring being urged against the groove outer side. The deformation of lip 139 can be accomplished by using a mandrel or any suitable swaging tool that will pass into the seat bore and contact surface 122 to bend the lip outward.

FIG. 8 shows the seal rings and lip 139 in their ultimate position. In this position groove inner side surfaces 128 and 138 are in flush contact with the inner side of seal ring 116 and the portion of seal ring 116 which occupies the deeper portion of seat groove 114 fills this portion of the groove. The transverse portion of outer seal ring 116 is deformed due to the pressure of the inner seal ring such that it substantialy fills the enlarged portion of the groove above step 144, and outer seal ring surface 190 is deformed with a portion thereof 191 bulged outwardly extending into groove portion defined by surfaces 152, 154, and 156. In FIG. 8 the innermost ends of the seal rings have been shaped in an angular relation to the seat bore 120. In its final form inner seal ring 116 has an inner seal face 192 cut in an angular relation to seat bore 120 over the major portion thereof with a innermost end portion 194 transverse to seat bore 120. Outer seal ring 118 also has its outer seal face 196 cut in an angular relation to seat bore 120 with the innermost end thereof 198 being transverse to seat bore 120. Seal faces 192 and 196 are substantially frusto-conical surfaces to provide a good sealing fit against the spherical exterior of ball valve member 106.

In the use of the novel seal assembly of this invention, in this embodiment inner seal ring 116 is the harder material and it tends to clean the sealing surface of ball valve member 106 thereby protecting the softer outer seal ring 118. Inner seal ring 116 provides a high pressure seal and outer seal ring 118 provides a low pressure seal. Inner seal ring 116 also functions to protect the outer seal ring when the valve is opened under high flow rate conditions thereby preventing erosion of the softer inner seal ring which would occur if the softer material was exposed directly to a high fluid flow rate.

Both embodiments of this seat construction offer definite advantages over the prior art bonded and pressed in seal ring construction. One advantage is that bonding is not required to secure the seal rings thus problems encountered with obtaining a good bond are avoided. Another advantage is the inherent self locking arrangement of the seal rings in the specially shaped grooves. This self locking feature of the invention secures the seal rings together and in the groove once the lip is deformed against the inner seal ring. The interfitting relation allows the softer composition seal ring to be retained by the harder composition seal ring.

What is claimed is:

1. A valve comprising:
   (a) a body with inlet and outlet flow passageways therethrough, a valve chamber therein in fluid communication with the inlet and outlet passageways, a valve member in the valve chamber movable between open and closed positions, an annular groove about one of the passageways facing the valve chamber and defined by inner and outer walls;
   (b) inner and outer concentric seal rings positioned in side by side relation in said groove with said outer seal ring against said outer wall and said inner seal ring against said inner wall;
   (c) said seal rings having respective flat interfitting surfaces thereon engaged with one another in an interlocking manner to hold the seal rings together against one another in the groove and to prevent relative longitudinal movement between the seal rings, and means including an enlarged projecting portion of one seal ring projecting into an enlarged portion of the groove to secure the seal rings within the groove;
   (d) one of said seal rings being of a relatively soft elastomeric composition having good low pressure sealing characteristics and the other of said seal rings being of a relatively hard plastic composition having good high pressure sealing characteristics.

2. The valve of claim 1 wherein said groove is further defined by a bottom extending between the inner and outer walls, said bottom having a pair of stepped portions presenting a flat shallow surface and a flat deep surface spaced farther from the valve chamber than said shallow surface, one of the seal rings being seated on said shallow surface and the other seal ring seated on said deep surface, said means to secure the seal rings gripping said seal rings in radial compression relative to the flow passageways and said interfitting surfaces urged together by the radial compression of the seal rings to hold said seal rings within the groove.

3. The valve of claim 2, wherein:
   (a) said interfitting surfaces include radially disposed abutting surfaces on adjoining portions of said seal rings such that the seal ring which rests on said shallow surface is retained by the other seal ring against movement out of the groove; and
   (b) said seal rings are concentric with and longitudinally elongated with respect to the associated flow passageway.

4. The valve of claim 3, wherein:
   (a) said outer seal ring rests on said deep surface and has a groove around a mid-portion of the inner peripheral surface thereof; and
   (b) said inner seal ring has a cross-sectionally enlarged portion resting on said shallow surface, said cross-sectionally enlarged portion extending in an outward direction into said outer seal ring inner peripheral groove and in a radially inward direction toward said associated flow passageway.

5. The valve of claim 4, wherein:
   (a) said annular groove outer wall has a uniform diameter inner portion and an enlarged diameter outer portion joining said bottom forming an enlarged portion of said annular groove adjacent said bottom;
   (b) a lip is defined by said inner wall and an interior portion of said passageway with said lip including a cross-sectionally thin portion near an inner portion thereof, a cross-sectionally enlarged portion between said thin portion and an inner end of said lip, a cross-sectionally thick portion adjacent said shallow stepped surface, and a portion of intermediate thickness adjacent said groove bottom with said lip shaped to compressively engage said inner seal ring enlarged projecting portion and the inner perimeter of said outer seal ring between said inner peripheral groove and said groove bottom; and (c) said lip has a dividing groove extending from said flow passageway toward said groove bottom with said portion of intermediate thickness between said dividing groove and said groove bottom.

6. In a valve having a valve body with inlet and outlet flow passageways therethrough, a valve chamber therein in fluid communication with the inlet and outlet passageways and a valve member in the valve chamber movable between open and closed positions, the improvement comprising:

(a) an annular groove around one flow passageway defined by an outer wall, a stepped bottom surface, and an inner wall;

(b) first and second concentric seal rings positioned in side by side relation in said groove with one seal ring against said groove outer wall and the other seal ring against said inner wall, each seal ring having a bottom portion in contact with said bottom surface of the groove and each seal ring having a sealing surface projecting out of the groove for sealing against the valve member;

(c) said first seal ring having a substantially greater thickness between the bottom portion and sealing surface thereof than the thickness of said second seal ring between the bottom portion and sealing surface thereof;

(d) said first and second seal rings presenting respective interfitting surfaces interlocked against one another to secure the seal rings together, the interfitting surface of said first seal ring being located intermediate the bottom portion and sealing surface thereof and facing away from the valve chamber; and (e) said second seal ring having an enlarged projecting portion extending away from the interfitting surface thereof and received in an enlarged portion of said groove to secure the seal rings in the groove.

7. The improvement of claim 6, including a second enlarged portion of said groove spaced from the first mentioned enlarged portion thereof, said second seal ring having a portion thereof received in said second enlarged portion of the groove to assist in securing the seal rings in the groove.

8. The improvement of claim 6, wherein said inner wall of the groove terminates in a first metal surface and said outer wall of the groove terminates in a second metal surface, said first metal surface projecting toward the valve chamber to a greater extent than said second metal surface to provide a seal with the valve member upon failure of said first and second seal rings.

* * * * *